(12) United States Patent
Tumuluru et al.

(10) Patent No.: US 10,417,447 B2
(45) Date of Patent: Sep. 17, 2019

(54) SELECTIVE DISPLAY OF PRIVATE USER INFORMATION

(71) Applicant: ARRIS Enterprises LLC, Suwanee, GA (US)

(72) Inventors: Sundar Murthy Tumuluru, Bangalore (IN); Albert F. Elcock, West Chester, PA (US); Aravind Soundararajan, Bangalore (IN); Lakshmi Arunkumar, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 199 days.

(21) Appl. No.: 15/183,113

(22) Filed: Jun. 15, 2016

(65) Prior Publication Data

US 2016/0364580 A1 Dec. 15, 2016

Related U.S. Application Data

(60) Provisional application No. 62/175,727, filed on Jun. 15, 2015.

(51) Int. Cl.
*H04L 29/06* (2006.01)
*G06F 21/62* (2013.01)
*H04L 29/08* (2006.01)

(52) U.S. Cl.
CPC .......... *G06F 21/6245* (2013.01); *H04L 63/10* (2013.01); *H04L 67/26* (2013.01); *G06F 2221/2113* (2013.01); *G06F 2221/2149* (2013.01); *H04L 63/102* (2013.01)

(58) Field of Classification Search
CPC ..... G06F 21/6245; H04L 67/26; H04L 63/04; H04L 63/083; H04L 63/102; H04L 63/10
See application file for complete search history.

(56) References Cited

U.S. PATENT DOCUMENTS

| | | | | |
|---|---|---|---|---|
| 5,721,829 A | * | 2/1998 | Dunn | H04N 7/17318 348/E5.097 |
| 5,960,152 A | * | 9/1999 | Sawabe | G11B 20/10527 386/327 |
| 6,067,400 A | * | 5/2000 | Saeki | G09B 5/065 386/243 |
| 6,108,486 A | * | 8/2000 | Sawabe | G11B 20/10 386/241 |
| 6,112,009 A | * | 8/2000 | Kikuchi | G06F 3/0601 386/241 |

(Continued)

*Primary Examiner* — David Garcia Cervetti
(74) *Attorney, Agent, or Firm* — Bart A. Perkins

(57) ABSTRACT

Methods, systems and computer readable media described herein may facilitate the automatic identification of a need for additional authentication based on a received private message or PID, the urgency of a received private message, thus determining whether an immediate alert is output to a user, and/or a determination whether a protected message is to be archived for later retrieval via authentication. A device may be configured (e.g., by user input) to control selective decoding and display of messages (e.g., private messages), registration and configuration of blacklists, and/or defining criteria for determining urgency of a received message. Device configurations may be dynamically changed or updated according to user preferences and user treatment of received messages.

17 Claims, 6 Drawing Sheets

(56) References Cited

U.S. PATENT DOCUMENTS

| | | | | |
|---|---|---|---|---|
| 6,167,084 A * | 12/2000 | Wang | H04N 21/23655 | 375/240.02 |
| 6,615,260 B1 * | 9/2003 | Honda | H04L 47/10 | 370/252 |
| 7,835,381 B1 * | 11/2010 | Barrass | H04J 3/1694 | 370/432 |
| 8,405,572 B1 * | 3/2013 | Want | G02F 1/1323 | 345/4 |
| 8,510,381 B1 * | 8/2013 | Birand | G06Q 10/10 | 709/204 |
| 8,640,257 B1 * | 1/2014 | Sherrets | G06F 21/6245 | 707/732 |
| 8,683,095 B1 * | 3/2014 | Ni | H04L 1/0061 | 370/395.52 |
| 8,811,951 B1 * | 8/2014 | Faaborg | H04M 1/57 | 455/411 |
| 8,922,480 B1 * | 12/2014 | Freed | G09G 5/00 | 345/156 |
| 9,037,455 B1 * | 5/2015 | Faaborg | G10L 21/00 | 704/208 |
| 9,647,978 B2 * | 5/2017 | Kirchhoff | H04M 3/436 | |
| 9,690,531 B2 * | 6/2017 | Kawaura | G06F 3/121 | |
| 9,733,736 B2 * | 8/2017 | Suzuki | G06F 3/0346 | |
| 9,747,775 B2 * | 8/2017 | Faaborg | G08B 21/18 | |
| 9,807,173 B2 * | 10/2017 | Shurtleff | H04L 67/12 | |
| 9,820,143 B2 * | 11/2017 | Park | H04W 12/02 | |
| 9,832,187 B2 * | 11/2017 | Faaborg | H04M 1/57 | |
| 9,854,562 B2 * | 12/2017 | Fu | H04W 4/12 | |
| 9,866,667 B2 * | 1/2018 | Gardenfors | G06F 1/1626 | |
| 10,075,414 B2 * | 9/2018 | Kweon | H04W 8/08 | |
| 10,187,855 B2 * | 1/2019 | Xu | H04W 4/12 | |
| 2001/0004361 A1 * | 6/2001 | Kobayashi | H04L 29/06027 | 370/401 |
| 2001/0005447 A1 * | 6/2001 | Kawamura | H04N 21/236 | 386/241 |
| 2002/0108119 A1 * | 8/2002 | Mao | H04L 45/22 | 725/109 |
| 2002/0126667 A1 * | 9/2002 | Oguchi | H04L 12/4641 | 370/389 |
| 2002/0137500 A1 * | 9/2002 | Brooking | H04M 3/53366 | 455/419 |
| 2002/0157114 A1 * | 10/2002 | Mobley | H04B 10/25751 | 725/121 |
| 2002/0196939 A1 * | 12/2002 | Unger | H04N 7/162 | 380/216 |
| 2003/0105826 A1 * | 6/2003 | Mayraz | G06Q 30/02 | 709/206 |
| 2003/0172386 A1 * | 9/2003 | Koo | H04L 29/06027 | 725/151 |
| 2004/0001488 A1 * | 1/2004 | Harri | H04L 12/2801 | 370/392 |
| 2004/0143633 A1 * | 7/2004 | McCarty | H04L 12/1813 | 709/206 |
| 2004/0153431 A1 * | 8/2004 | Bhogal | G06F 21/6227 | |
| 2004/0177369 A1 * | 9/2004 | Akins, III | H04N 5/76 | 725/31 |
| 2004/0229614 A1 * | 11/2004 | Kim | H04W 48/02 | 455/435.1 |
| 2005/0160166 A1 * | 7/2005 | Kraenzel | H04H 60/48 | 709/224 |
| 2005/0176413 A1 * | 8/2005 | Lee | H04L 12/14 | 455/414.1 |
| 2006/0178146 A1 * | 8/2006 | Lee | H04W 8/04 | 455/435.1 |
| 2006/0270409 A1 * | 11/2006 | Voss | H04W 24/08 | 455/442 |
| 2007/0005713 A1 * | 1/2007 | LeVasseur | H04L 63/126 | 709/206 |
| 2007/0136466 A1 * | 6/2007 | Etelapera | G06F 3/1454 | 709/225 |
| 2007/0160052 A1 * | 7/2007 | Okada | H04L 45/742 | 370/392 |
| 2007/0200914 A1 * | 8/2007 | DuMas | G08B 13/19645 | 348/14.01 |
| 2007/0201501 A1 * | 8/2007 | Suzuki | H04W 72/1242 | 370/412 |
| 2008/0043775 A1 * | 2/2008 | Fujinami | H04N 9/8205 | 370/498 |
| 2008/0052759 A1 * | 2/2008 | Kronlund | G06F 21/6209 | 726/2 |
| 2008/0077673 A1 * | 3/2008 | Thomas | H04L 51/24 | 709/206 |
| 2008/0239074 A1 * | 10/2008 | Li | G06F 3/1454 | 348/143 |
| 2009/0018850 A1 * | 1/2009 | Abhyanker | G06Q 30/02 | 705/325 |
| 2009/0019553 A1 * | 1/2009 | Narayanaswami | H04L 63/0428 | 726/28 |
| 2009/0125593 A1 * | 5/2009 | Hiir | G06Q 10/107 | 709/206 |
| 2009/0141655 A1 * | 6/2009 | Kim | H04L 12/2801 | 370/254 |
| 2010/0162337 A1 * | 6/2010 | Lee | H04L 12/2801 | 725/111 |
| 2010/0210315 A1 * | 8/2010 | Miyake | H04L 51/24 | 455/569.2 |
| 2010/0275266 A1 * | 10/2010 | Jakobson | G06F 3/14 | 726/26 |
| 2011/0113109 A1 * | 5/2011 | LeVasseur | H04L 51/12 | 709/206 |
| 2011/0167357 A1 * | 7/2011 | Benjamin | H04L 12/1818 | 715/753 |
| 2011/0219423 A1 * | 9/2011 | Aad | G06F 21/00 | 726/1 |
| 2011/0289161 A1 * | 11/2011 | Rankin, Jr. | G06Q 10/107 | 709/206 |
| 2011/0296308 A1 * | 12/2011 | Yi | G06F 21/52 | 715/733 |
| 2011/0311045 A1 * | 12/2011 | Candelore | H04N 7/1675 | 380/210 |
| 2012/0009897 A1 * | 1/2012 | Kasad | H04L 63/107 | 455/411 |
| 2012/0131471 A1 * | 5/2012 | Terlouw | G06F 3/04883 | 715/741 |
| 2012/0173622 A1 * | 7/2012 | Toledano | H04L 65/4076 | 709/204 |
| 2012/0173635 A1 * | 7/2012 | Wormald | G06Q 10/107 | 709/206 |
| 2012/0191764 A1 * | 7/2012 | Leibu | G06Q 30/02 | 707/821 |
| 2012/0198017 A1 * | 8/2012 | LeVasseur | H04L 51/24 | 709/206 |
| 2012/0317605 A1 * | 12/2012 | Brogan | H04N 21/64707 | 725/109 |
| 2013/0089203 A1 * | 4/2013 | Solow | H04N 21/2351 | 380/255 |
| 2013/0096917 A1 * | 4/2013 | Edgar | G10L 15/00 | 704/246 |
| 2013/0145295 A1 * | 6/2013 | Bocking | G06F 3/017 | 715/764 |
| 2013/0156186 A1 * | 6/2013 | Candelore | H04N 7/1675 | 380/210 |
| 2013/0173718 A1 * | 7/2013 | Bhat | H04L 51/12 | 709/206 |
| 2013/0227495 A1 * | 8/2013 | Rydenhag | G06F 3/0484 | 715/863 |
| 2013/0346408 A1 * | 12/2013 | Duarte | G06Q 10/10 | 707/737 |
| 2013/0346922 A1 * | 12/2013 | Shiplacoff | G06F 3/04842 | 715/835 |
| 2014/0035763 A1 * | 2/2014 | Whitlow | G08G 5/0013 | 340/901 |
| 2014/0189726 A1 * | 7/2014 | Yoneda | H04N 21/25816 | 725/25 |
| 2014/0201844 A1 * | 7/2014 | Buck | G06F 21/50 | 726/26 |

(56) References Cited

U.S. PATENT DOCUMENTS

| | | | |
|---|---|---|---|
| 2014/0256288 A1* | 9/2014 | Allen | H04W 12/02 455/411 |
| 2014/0298195 A1* | 10/2014 | Chatterjee | H04L 67/306 715/745 |
| 2015/0025919 A1* | 1/2015 | West | G06Q 50/12 705/5 |
| 2015/0082446 A1* | 3/2015 | Flowers | G06F 3/0488 726/26 |
| 2015/0089666 A1* | 3/2015 | Lee | G06F 21/53 726/27 |
| 2015/0101066 A1* | 4/2015 | Fram | G06F 16/95 726/28 |
| 2015/0113077 A1* | 4/2015 | Dubie | H04L 51/12 709/206 |
| 2015/0130623 A1* | 5/2015 | Robison | G08B 21/18 340/636.1 |
| 2015/0186660 A1* | 7/2015 | Sherrets | G06F 21/604 726/30 |
| 2015/0278534 A1* | 10/2015 | Thiyagarajan | G06F 21/62 726/28 |
| 2015/0281919 A1* | 10/2015 | Izumi | H04W 4/12 455/412.2 |
| 2015/0288633 A1* | 10/2015 | Ogundokun | H04L 51/12 709/206 |
| 2016/0059864 A1* | 3/2016 | Feit | B60K 35/00 701/36 |
| 2016/0188387 A1* | 6/2016 | Yang | G06F 9/542 719/318 |
| 2016/0192324 A1* | 6/2016 | Zhang | G06F 21/6245 455/458 |
| 2016/0198433 A1* | 7/2016 | Fu | H04W 4/12 455/458 |
| 2016/0225337 A1* | 8/2016 | Ek | G09G 5/003 |
| 2016/0225343 A1* | 8/2016 | Ek | H04N 13/334 |
| 2016/0261532 A1* | 9/2016 | Garbin | H04L 51/04 |
| 2016/0277335 A1* | 9/2016 | Cheung | H04L 51/12 |
| 2016/0285974 A1* | 9/2016 | Shurtleff | H04L 67/12 |
| 2016/0300081 A1* | 10/2016 | Weksler | G06F 21/84 |
| 2016/0316362 A1* | 10/2016 | Ding | H04W 8/26 |
| 2016/0335225 A1* | 11/2016 | Yoshihama | G06F 3/14 |
| 2016/0366267 A1* | 12/2016 | Vinmani | H04M 1/72547 |
| 2017/0010771 A1* | 1/2017 | Bernstein | G06F 1/165 |
| 2017/0109543 A1* | 4/2017 | Li | G06F 21/6245 |
| 2017/0245017 A1* | 8/2017 | Chaudhri | G06F 3/0416 |
| 2017/0325171 A1* | 11/2017 | Xu | H04W 4/12 |
| 2017/0329399 A1* | 11/2017 | Azam | G06F 3/013 |
| 2017/0366494 A1* | 12/2017 | Hiir | G06Q 10/107 |
| 2017/0374034 A1* | 12/2017 | Zuniga | H04L 63/102 |
| 2017/0374397 A1* | 12/2017 | Rylskiy | H04N 21/23418 |

* cited by examiner

SELECTIVE DISPLAY OF PRIVATE USER INFORMATION

CROSS REFERENCE TO RELATED APPLICATION

This application is a non-provisional application claiming the benefit of U.S. Provisional Application Ser. No. 62/175,727, entitled "Selectively Decoding and Presenting Private User Information," which was filed on Jun. 15, 2015, and is incorporated herein by reference in its entirety.

TECHNICAL FIELD

This disclosure relates to the selective display of private user information.

BACKGROUND

A customer premise equipment (CPE) device such as a gateway device or set-top box (STB) is typically provided by a multiple-system operator (MSO) to a subscriber so that the subscriber may receive multimedia services offered by the MSO. The CPE device can be used by the subscriber to access a variety of data services, telephony or voice services, and multimedia services, including but not limited to live or linear television, digital video recorder (DVR) content, video-on-demand (VoD) content, over-the-top (OTT) content, and others.

Advanced technologies enable devices to send and receive messages from other devices. Also, these messages may be sent to all devices connected to a network where a user has authorization to view content so that the user gets the message on all user devices. This creates a problem with the security of the message. Sometimes these devices present private messages on devices that are not being used in a private manner. For example, a user may find it undesirable to receive a private message when the user is watching content with others (friends, family members, etc.). Message forwarding techniques may allow a message that is sent to a mobile phone to be routed to another network and traverse through a different path to reach other devices connected to a home network or office network.

Since mobile phones are typically operated by users using a security pass code, privacy issues might not arise with content viewed on a mobile phone. However, if the same message is provided through a different device (e.g., television), then the user might not be expecting the message to be displayed at the different device. For example, a message received on a phone might also be received and displayed on a television through a customer premise equipment (CPE) device such as a set-top box (STB).

Moreover, calls received on a VoIP (voice over Internet protocol) phone may be confidential and may require authentication before being displayed on a television. If someone calls on a VoIP phone, the call is typically routed through a headend in which the call is translated to an AGM (application gateway message). The message traverses through a QAM (quadrature amplitude modulation) network and reaches a target client (e.g., STB, gateway, etc.). The message may be processed and displayed on a television. Also, if there are multiple clients within a home, then messages/calls may be displayed on all connected televisions, but a user might not want all messages/calls, especially private messages/calls to be displayed on all connected televisions.

Various undesirable consequences may arise when a user does not have the option to configure privacy settings for received messages, calls, and other information. Therefore, it is desirable to improve upon methods and systems for forwarding communications at CPE devices within a subscriber premise.

BRIEF DESCRIPTION OF THE DRAWINGS

Like reference numbers and designations in the various drawings indicate like elements.

DETAILED DESCRIPTION

Figure 1:
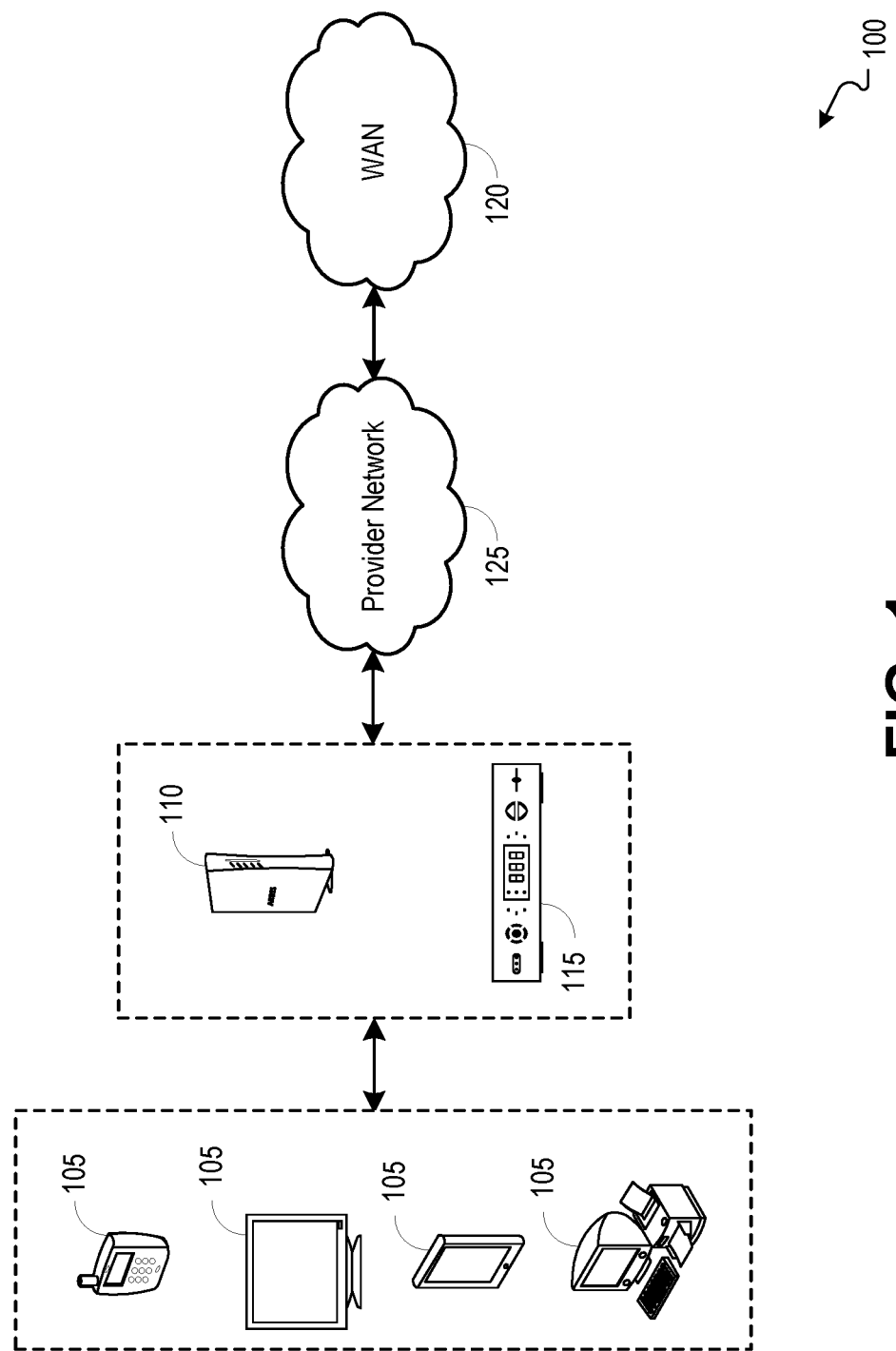
FIG. 1 is a block diagram illustrating an example network environment operable to facilitate the selective forwarding of communication information.

It is desirable to improve upon methods and systems for forwarding communications at CPE devices within a subscriber premise. Methods, systems and computer readable media described herein may facilitate the automatic identification of a need for additional authentication based on a received private message or PID, the urgency of a received private message, thus determining whether an immediate alert is output to a user, and/or a determination whether a protected message is to be archived for later retrieval via authentication. A device may be configured (e.g., by user input) to control selective decoding and display of messages (e.g., private messages), registration and configuration of blacklists, and/or defining criteria for determining urgency of a received message. Device configurations may be dynamically changed or updated according to user preferences and user treatment of received messages.

The feature described herein allows phone messages, caller ID, appointment reminders, and notices to be sent to display via a CPE device. Private user data is sent as an application gateway stream from a central office (e.g., headend). The application gateway stream carries an application gateway message. The application gateway message PID is defined in an application gateway descriptor associated with an auxiliary configuration message. For example, the auxiliary configuration message is received on the EMM PID. The CPE device configures the acquisition filter on the application gateway message PID, extracts the private user message and passes it up to the application for display.

An embodiment of the invention described herein may include a method comprising: (a) receiving a communication at a customer premise equipment device; (b) identifying a property of the received communication; (c) comparing the identified property to one or more private communication properties, the one or more private communication properties comprising properties of communications that are designated for privacy protection; (d) if the identified property does not match at least one of the one or more properties, outputting information associated with the communication to a display; and (e) if the identified property does match at least one of the one or more properties, refraining from outputting, to a display, information associated with the communication until a valid passcode is received.

According to an embodiment of the invention, the identified property of the received communication comprises a packet identifier, and the one or more private communication properties comprise one or more packet identifiers designated for privacy protection.

According to an embodiment of the invention, the identified property of the received communication comprises a source identifier, and the one or more private communication properties comprise one or more source identifiers designated for privacy protection.

According to an embodiment of the invention, the identified property of the received communication comprises a version identifier, and the one or more private communication properties comprise one or more version identifiers and, for each respective version identifier, a count of the number of times a communication having the respective version identifier has been previously received at the customer premise equipment device.

According to an embodiment of the invention, the method described herein further comprises: (a) if the identified property does match at least one of the one or more properties: (i) outputting a notification to a user that a privacy protected communication has been received at the customer premise equipment device; (ii) receiving a valid passcode; and (iii) outputting information associated with the communication to a display.

According to an embodiment of the invention, the notification comprises a prompt requesting entry of a valid passcode.

According to an embodiment of the invention, the method described herein further comprises storing information associated with the communication at the customer premise equipment device.

An embodiment of the invention described herein may include an apparatus comprising: (a) one or more interfaces configured to be used to receive a communication; and (b) one or more modules configured to: (i) identify a property of the received communication; (ii) compare the identified property to one or more private communication properties, the one or more private communication properties comprising properties of communications that are designated for privacy protection; (iii) if the identified property does not match at least one of the one or more properties, output information associated with the communication to a display; and (iv) if the identified property does match at least one of the one or more properties, refrain from outputting, to a display, information associated with the communication until a valid passcode is received.

According to an embodiment of the invention, if the identified property does match at least one of the one or more properties, the one or more modules are further configured to: (a) output a notification to a user that a privacy protected communication has been received at the customer premise equipment device; (b) receive a valid passcode; and (c) output information associated with the communication to a display.

According to an embodiment of the invention, the notification comprises a prompt requesting entry of a valid passcode.

An embodiment of the invention described herein may include one or more non-transitory computer readable media having instructions operable to cause one or more processors to perform the operations comprising: (a) receiving a communication at a customer premise equipment device; (b) identifying a property of the received communication; (c) comparing the identified property to one or more private communication properties, the one or more private communication properties comprising properties of communications that are designated for privacy protection; (d) if the identified property does not match at least one of the one or more properties, outputting information associated with the communication to a display; and (e) if the identified property does match at least one of the one or more properties, refraining from outputting, to a display, information associated with the communication until a valid passcode is received.

According to an embodiment of the invention, if the identified property does match at least one of the one or more properties, the instructions are further operable to cause one or more processors to perform the operations comprising: (a) outputting a notification to a user that a privacy protected communication has been received at the customer premise equipment device; (b) receiving a valid passcode; and (c) outputting information associated with the communication to a display.

According to an embodiment of the invention, the notification comprises a prompt requesting entry of a valid passcode.

According to an embodiment of the invention, the instructions are further operable to cause one or more processors to perform the operations comprising storing information associated with the communication at the customer premise equipment device.

FIG. 1 is a block diagram illustrating an example network environment 100 operable to facilitate the selective forwarding of communication information. In embodiments, video, voice, and/or data services may be delivered to one or more client devices 105. Client devices 105 may include televisions, mobile devices, tablets, computers, set-top boxes (STB), telephones (e.g., voice over Internet protocol (VoIP) telephones), gaming devices, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, and others.

In embodiments, one or more services delivered to a subscriber premises may be received and forwarded to one or more client devices 105 by a customer premise equipment (CPE) device such as an access device 110 and or STB 115. An access device 110 may include a gateway device (e.g., residential gateway, multimedia gateway, etc.), a router, a wireless network extender, or any other device configured to route communications to and from one or more client devices 105. It should be understood that the devices shown in FIG. 1 may be integrated. For example, a client device 105 such as a television may be connected to a STB 115, an access device 110, and/or may be directly connected to an upstream network.

In embodiments, multiple services (e.g., video, voice, and/or data services) may be delivered from a wide-area network (WAN) 120 to an access device 110 or STB 115 through a connection between the device and a provider network 125. The provider network 125 may include an optical network, hybrid fiber coaxial (HFC) network, digital subscriber line (DSL) network, twisted-pair, mobile network, high-speed data network, MoCA network, and others. Multiple systems operator (MSO) or service provider devices and/or networks within the WAN 120 may be used to provide, manage, and/or troubleshoot the multiple services provided to subscribers. In embodiments, a STB 115 may receive one or more services from an access device 110. For example, network communications/messages, Internet protocol television (IPTV) content or any other streaming content may be streamed from the access device 110 to the STB 115 for output to an associated display device (e.g., television).

In embodiments, multiple services may be delivered from an access device 110 or STB 115 to one or more client devices 105 through a local network. The local network may include a local area network (LAN), wireless local area network (WLAN), personal area network (PAN), Multimedia over Coax Alliance (MoCA) network, mobile hotspot network, and others. The local network may be provided at a subscriber premises by the access device 110 or one or more other access points within the premises. It will be appreciated by those skilled in the relevant art that delivery of the multiple services over the local network may be accomplished using a variety of standards and formats.

In embodiments, a CPE device may be configured to receive communications or messages from upstream network components or other device within an associated subscriber premise. The CPE device may forward a received communication to another device such as a connected or associated display device or other client device 105. The CPE device may forward the received communication for display of content or other information associated with the communication.

Various settings may allow configuration of which messages are to be protected when received by a CPE device. A setting may be used to allow the user to determine if all messages received by a CPE device can be output or forwarded for display or only priority messages should be displayed. In embodiments, a user can register specific types of messages, messages received from specific sources (e.g., phone numbers), and/or messages of a specific version that are to be protected. For example, a version field may be used in an application gateway message (AGM).

In embodiments, message display may be protected by a PIN (personal identification number). When the user keys in a valid PIN, the message may be displayed on one or more associated devices. In embodiments, at a headend or other network element or server, a normal PID (packet identifier) may be defined for AGM messages and a special PID may be defined for messages that are to be protected. For example, headend software can implement an algorithm to determine which messages need to be treated as a default message (e.g., normal PID) and which ones need to be treated as a protected message (e.g., the special PID). Messages that arrive at a CPE device with the default PID can be displayed, and messages that arrive at the CPE device with the special PID may be displayed only upon entry of an associated PIN.

In embodiments, a mobile phone may be configured in such a way that if a call is not answered in a certain number of rings then the call is forwarded to a VoIP (voice over Internet protocol) phone connected within a subscriber premise. This can trigger a message/caller-ID display on a television. A mobile application, developed for this purpose, may have a feature to block this mechanism for confidential number(s) to avoid privacy issues. In embodiments, each mobile device may be registered with one or more STBs to view the call history of the phone.

In embodiments, a PIN is set at a CPE device to allow messages/caller-ID, and other information to be displayed on a television. The PIN can be set for each individual CPE device of a plurality of CPE devices if the devices are separately connected to an upstream network element. Where CPE devices are connected through a home gateway, then a common PIN may be set to allow the display of caller ID/messages or other information. This allows users to view information on any connected television within a home.

In embodiments, all calls received from a VoIP phone can be cached in a CPE device and can be displayed on a television. For example, call history (e.g., caller ID, received time, etc.) may be stored at one or more CPE devices for access by a user. The number of calls to cache can be based on the memory availability on a CPE device.

In embodiments, via a settings menu, the user may configure the CPE device with the type of messages to be displayed (e.g., All or Priority messages). If "All" is chosen, all messages will be displayed. Alternatively, only certain messages (i.e., messages not designated for privacy protection) may be displayed.

In embodiments, an upstream device or server may use a reserved bit field in an AGM message to indicate priority or privacy protection/restrictions. For example, when a message with this bit field set to 1 arrives at the CPE device, it would imply "special message" and the CPE device would only display the message upon entry of a valid PIN/password. If the bit field is set to 0, it would imply an ordinary message, and the CPE device would display the message without authentication.

In embodiments, via a settings menu, a user may register the phone numbers whose messages/notifications/caller ID should be protected. Headend software may provide the phone number along with the message to the CPE device. The platform can compare the user configured number against the number from which the message/call was received and determine if it can be displayed or not.

In embodiments, a version field may be associated in the "application gateway message." If the message with the same version is received more than a specified number of times (for example 5 times or any other number of times as configured by a user), the platform will interpret the message as urgent (e.g., SOS message), which indicates that the message needs the immediate attention of the user. Based on the interpretation of the message as urgent, the message can be sent up to the application for immediate display. If the version differs, it would archive the message for retrieval by the user via authentication (PIN).

It should be understood that the features described herein may be enabled/disabled through a toggle (on/off) in a settings menu (e.g., Caller ID: ON/OFF; Message: ON/OFF).

Figure 2:
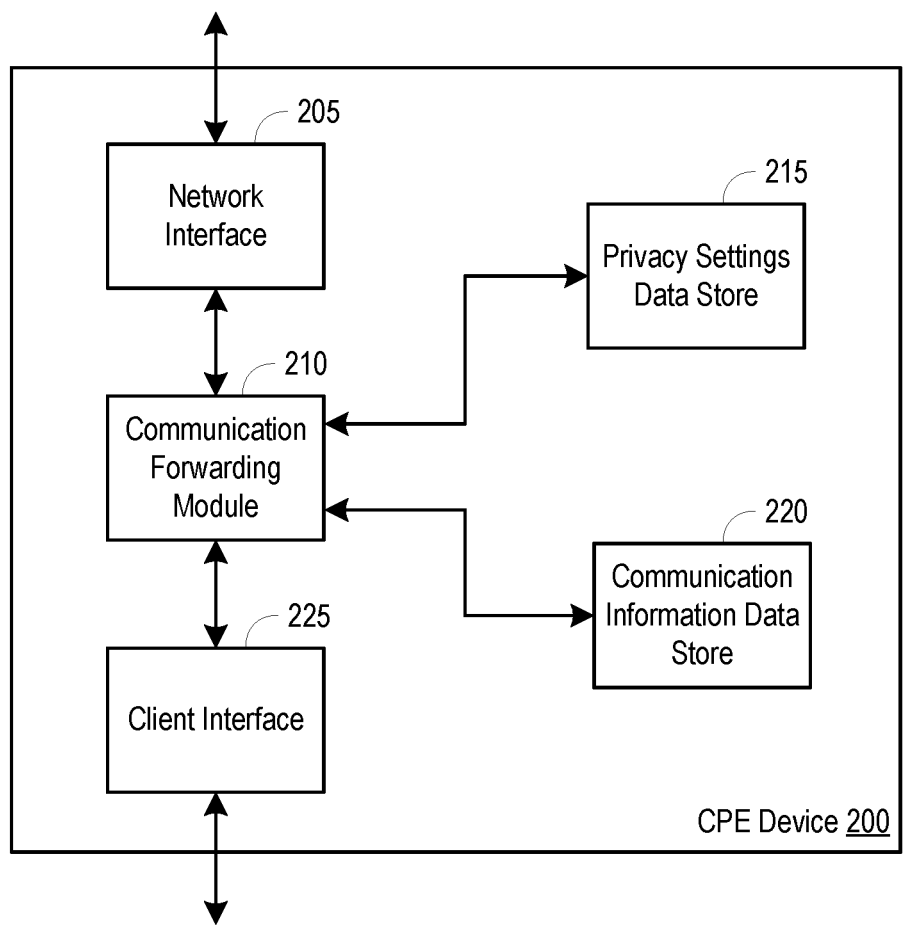
FIG. 2 is a block diagram illustrating an example customer premise equipment (CPE) device operable to facilitate the selective forwarding of communication information.

FIG. 2 is a block diagram illustrating an example CPE device 200 operable to facilitate the selective forwarding of communication information. The CPE device 200 may include a network interface 205, a communication forwarding module 210, a privacy settings data store 215, a communication information data store 220, and a client interface 225. The CPE device 200 may be an access device 110 of FIG. 1, a STB 115 of FIG. 1, or any other device configured to deliver one or more services to a client device (e.g., client device 105 of FIG. 1).

In embodiments, one or more messages or communications may be received at the CPE device 200 via the network interface 205. The CPE device 200 may be configured to receive communications or messages from upstream network components or other device within an associated subscriber premise. The CPE device 200 may forward a received communication to another device such as a connected or associated display device or other client device 105 through the client interface 225.

In embodiments, a default PID may be defined for general AGM messages and a special PID may be defined for messages to be protected. For example, the default PID and special PID may be stored and updated at the privacy settings data store 215. The headend software may implement an algorithm to determine which messages will be sent on "default" PID and which ones will be sent on the "special" PID. Messages that arrive at the CPE device 200 on the default PID may be displayed without authentication. Messages that arrive at the CPE device 200 on the special PID may be archived within the communication information data store 220, and the user can only be alerted about the arrival of the message. Upon user request, the private or protected message may be displayed on entry of a correct PIN. The communication forwarding module 210 may be configured to recognize whether a PID of a received communication is a default PID or a special PID.

The privacy settings data store 220 may include various settings controlling which messages are to be protected when received by the CPE device 200. A setting may be used to allow the user to determine if all messages received by the CPE device 200 can be output or forwarded for display or only priority messages should be displayed. In embodiments, a user can register specific types of messages, messages received from specific sources (e.g., phone numbers), and/or messages of a specific version that are to be protected. For example, a version field may be used in an application gateway message (AGM).

In embodiments, the communication forwarding module 210 may output a message or communication information deemed to be protected when a valid PIN/password is received. When the user keys in a valid PIN, the communication forwarding module 210 may cause the message to be displayed on one or more associated devices.

In embodiments, via the privacy settings data store 215, a user may register the phone numbers whose messages/notifications/caller ID should be protected. Headend software may provide the phone number along with the message to the CPE device 200, and the communication forwarding module 210 can compare the user configured number against the number from which the message/call was received and determine if it can be displayed or not.

In embodiments, when a message is designated for privacy protection, the message and/or associated communication information may be temporarily stored or cached at the communication information data store 220.

Figure 3:
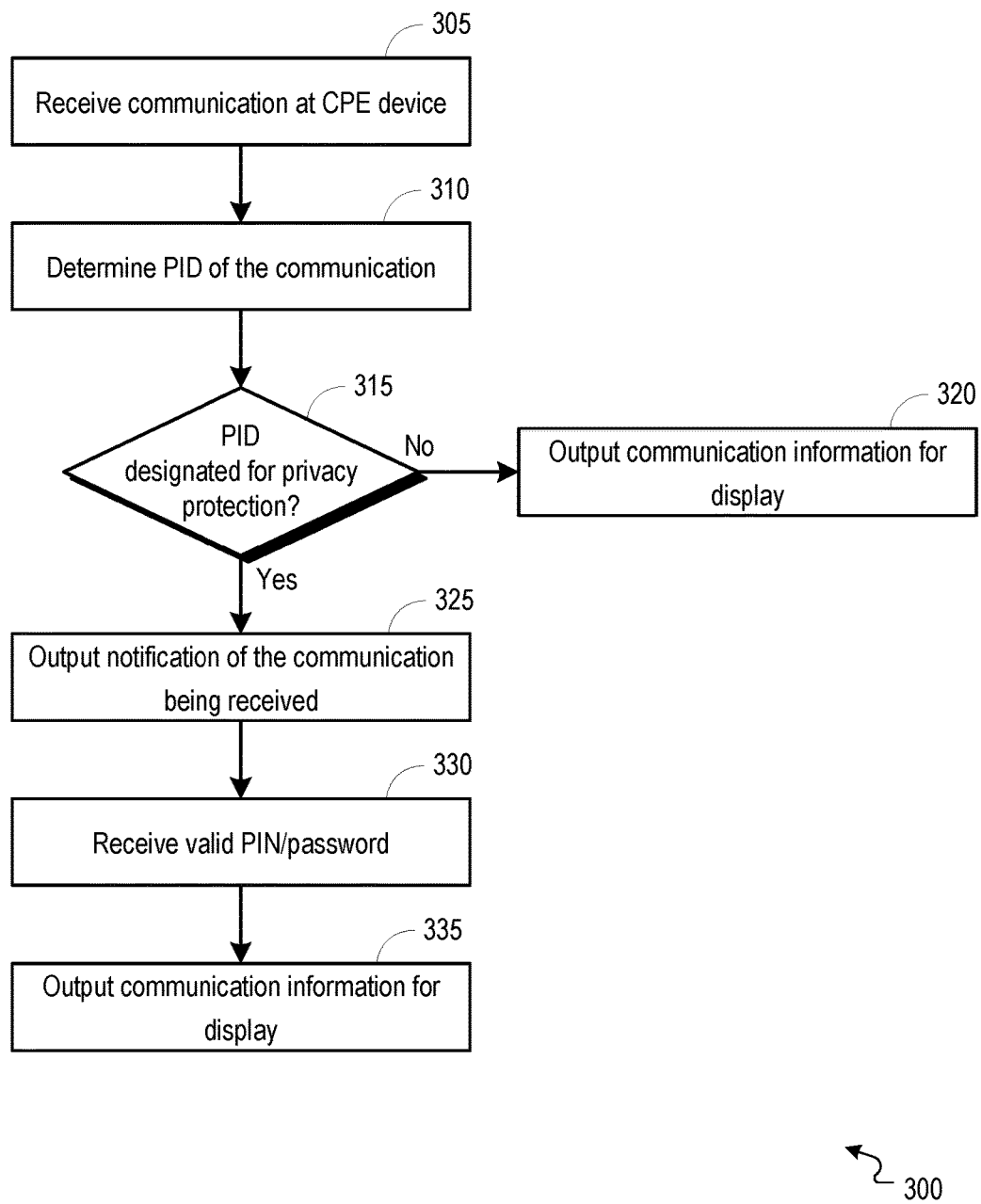
FIG. 3 is a flowchart illustrating an example process operable to facilitate the selective forwarding of communication information based on an identified packet identifier (PID) of the communication.

FIG. 3 is a flowchart illustrating an example process 300 operable to facilitate the selective forwarding of communication information based on an identified PID of the communication. The process 300 can begin at 305, when a communication is received at a CPE device. The CPE device may be an access device 110 of FIG. 1, a STB 115 of FIG. 1, or any other device configured to provide one or more services to a client device (e.g., client device 105 of FIG. 1). The received communication may be a telephone call or message, an appointment or calendar reminder, an electronic mail message, a notification of a received message, communication information (e.g., caller identification information), and various other types of communications.

At 310, a PID (packet identifier) of the communication may be determined. The PID may be determined, for example, by the communication forwarding module 210 of FIG. 2. In embodiments the PID may be parsed from the received communication and analyzed by the communication forwarding module 210.

At 315, a determination may be made whether the PID is designated for privacy protection. The determination whether the PID is designated for privacy protection may be made, for example, by the communication forwarding module 210 of FIG. 2. In embodiments, the communication forwarding module 210 may compare the PID to one or more PID values that are designated for privacy protection (e.g., PID values stored at the privacy settings data store 215 of FIG. 2). For example, the CPE device may be configured with one or more PID values that are designated for privacy protection. A received PID that matches a PID value designated for privacy protection may be temporarily withheld from display until a valid password or PIN is received. It should be understood that the CPE device may be configured with PID values designated for privacy protection via input from a user, MSO, technician, manufacturer, and/or others, or the PID values may be updated at a CPE device as configuration updates.

If, at 315, the determination is made that the PID does not match a PID value designated for privacy protection, the process 300 may proceed to 320. At 320, communication information associated with the received communication may be output for display. The communication information may be output, for example, by the communication forwarding module 210 of FIG. 2 to a connected or associated display device (e.g., client device 105 of FIG. 1). In embodiments, the communication information may include a telephone voice or text message, a telephone call, caller identification information (e.g., caller name, location, phone number, etc.), a notification, a reminder, or other content or information associated with a message received at the CPE device.

If, at 315, the determination is made that the PID matches a PID value designated for privacy protection, the process 300 may proceed to 325. At 325, a notification of the communication being received may be output. The notification of the communication being received may be output, for example, by the communication forwarding module 210 of FIG. 2 to a connected or associated display device (e.g., client device 105 of FIG. 1). In embodiments, the notification may only include enough information to inform a viewer that a communication has been received. For example, to protect the privacy of the message, the notification may not include any information identifying the sender or the content of the received communication. In embodiments, when the determination is made that the communication is to be protected, the communication forwarding module 210 may cause the communication and/or information associated with the communication to be temporarily stored or cached at the CPE device (e.g., at the communication information data store 220 of FIG. 2).

At 330, a valid PIN/password may be received. The valid PIN/password may be received, for example, by the communication forwarding module 210 of FIG. 2. In embodiments, a user may request that the communication be output for display, and in response, the CPE device may output a prompt to a display device, the prompt requesting that the user input a valid PIN/password. For example, the CPE device may be configured with a PIN/password to protect the privacy of certain communications. The CPE device (e.g., the communication forwarding module 210) may compare a received PIN/password to a PIN/password with which the CPE device is configured, and if the PIN/password received from the user matches the PIN/password configured at the CPE device, the determination may be made that a valid PIN/password has been received.

At 335, the communication and/or information associated with the communication may be output for display. The communication information may be output, for example, by the communication forwarding module 210 of FIG. 2 to a connected or associated display device (e.g., client device 105 of FIG. 1). In embodiments, the communication information may include a telephone voice or text message, a telephone call, caller identification information (e.g., caller name, location, phone number, etc.), a notification, a reminder, or other content or information associated with a message received at the CPE device.

Figure 4:
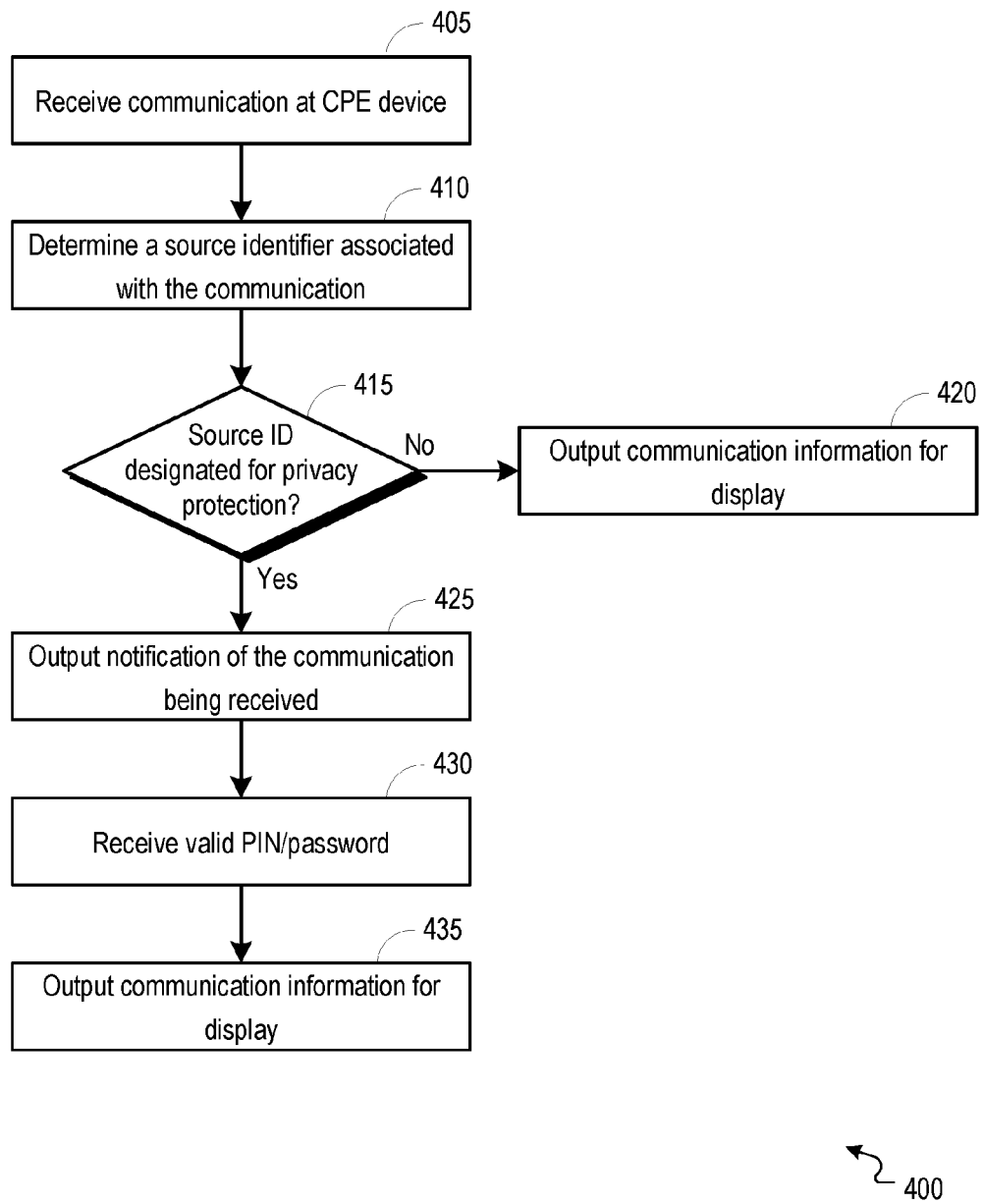
FIG. 4 is a flowchart illustrating an example process operable to facilitate the selective forwarding of communication information based on a source identifier of the communication.

FIG. 4 is a flowchart illustrating an example process 400 operable to facilitate the selective forwarding of communication information based on a source identifier of the communication. The process 400 can begin at 405, when a communication is received at a CPE device. The CPE device may be an access device 110 of FIG. 1, a STB 115 of FIG. 1, or any other device configured to provide one or more services to a client device (e.g., client device 105 of FIG. 1). The received communication may be a telephone call or message, an appointment or calendar reminder, an electronic mail message, a notification of a received message, communication information (e.g., caller identification information), and various other types of communications.

At 410, a source identifier of the communication may be determined. The source identifier may be determined, for example, by the communication forwarding module 210 of FIG. 2. In embodiments the source identifier may be parsed from the received communication and analyzed by the communication forwarding module 210. The source identifier may include a name, location, telephone number, electronic mail address, social media address or name, IP address, media access control (MAC) address, and any other information that may be used to identify the source of the received communication.

At 415, a determination may be made whether the source identifier is designated for privacy protection. The determination whether the source identifier is designated for privacy protection may be made, for example, by the communication forwarding module 210 of FIG. 2. In embodiments, the communication forwarding module 210 may compare the source identifier to one or more source identifiers that are designated for privacy protection (e.g., source identifiers stored at the privacy settings data store 215 of FIG. 2). For example, the CPE device may be configured with one or more source identifiers that are designated for privacy protection. A received source identifier that matches a source identifier designated for privacy protection may be temporarily withheld from display until a valid password or PIN is received. It should be understood that the CPE device may be configured with source identifiers designated for privacy protection via input from a user, MSO, technician, manufacturer, and/or others, or the source identifiers may be updated at a CPE device as configuration updates.

If, at 415, the determination is made that the source identifier does not match a source identifier designated for privacy protection, the process 400 may proceed to 420. At 420, communication information associated with the received communication may be output for display. The communication information may be output, for example, by the communication forwarding module 210 of FIG. 2 to a connected or associated display device (e.g., client device 105 of FIG. 1). In embodiments, the communication information may include a telephone voice or text message, a telephone call, caller identification information (e.g., caller name, location, phone number, etc.), a notification, a reminder, or other content or information associated with a message received at the CPE device.

If, at 415, the determination is made that the source identifier matches a source identifier designated for privacy protection, the process 400 may proceed to 425. At 425, a notification of the communication being received may be output. The notification of the communication being received may be output, for example, by the communication forwarding module 210 of FIG. 2 to a connected or associated display device (e.g., client device 105 of FIG. 1). In embodiments, the notification may only include enough information to inform a viewer that a communication has been received. For example, to protect the privacy of the message, the notification may not include any information identifying the sender or the content of the received communication. In embodiments, when the determination is made that the communication is to be protected, the communication forwarding module 210 may cause the communication and/or information associated with the communication to be temporarily stored or cached at the CPE device (e.g., at the communication information data store 220 of FIG. 2).

At 430, a valid PIN/password may be received. The valid PIN/password may be received, for example, by the communication forwarding module 210 of FIG. 2. In embodiments, a user may request that the communication be output for display, and in response, the CPE device may output a prompt to a display device, the prompt requesting that the user input a valid PIN/password. For example, the CPE device may be configured with a PIN/password to protect the privacy of certain communications. The CPE device (e.g., the communication forwarding module 210) may compare a received PIN/password to a PIN/password with which the CPE device is configured, and if the PIN/password received from the user matches the PIN/password configured at the CPE device, the determination may be made that a valid PIN/password has been received.

At 435, the communication and/or information associated with the communication may be output for display. The communication information may be output, for example, by the communication forwarding module 210 of FIG. 2 to a connected or associated display device (e.g., client device 105 of FIG. 1). In embodiments, the communication information may include a telephone voice or text message, a telephone call, caller identification information (e.g., caller name, location, phone number, etc.), a notification, a reminder, or other content or information associated with a message received at the CPE device.

Figure 5:
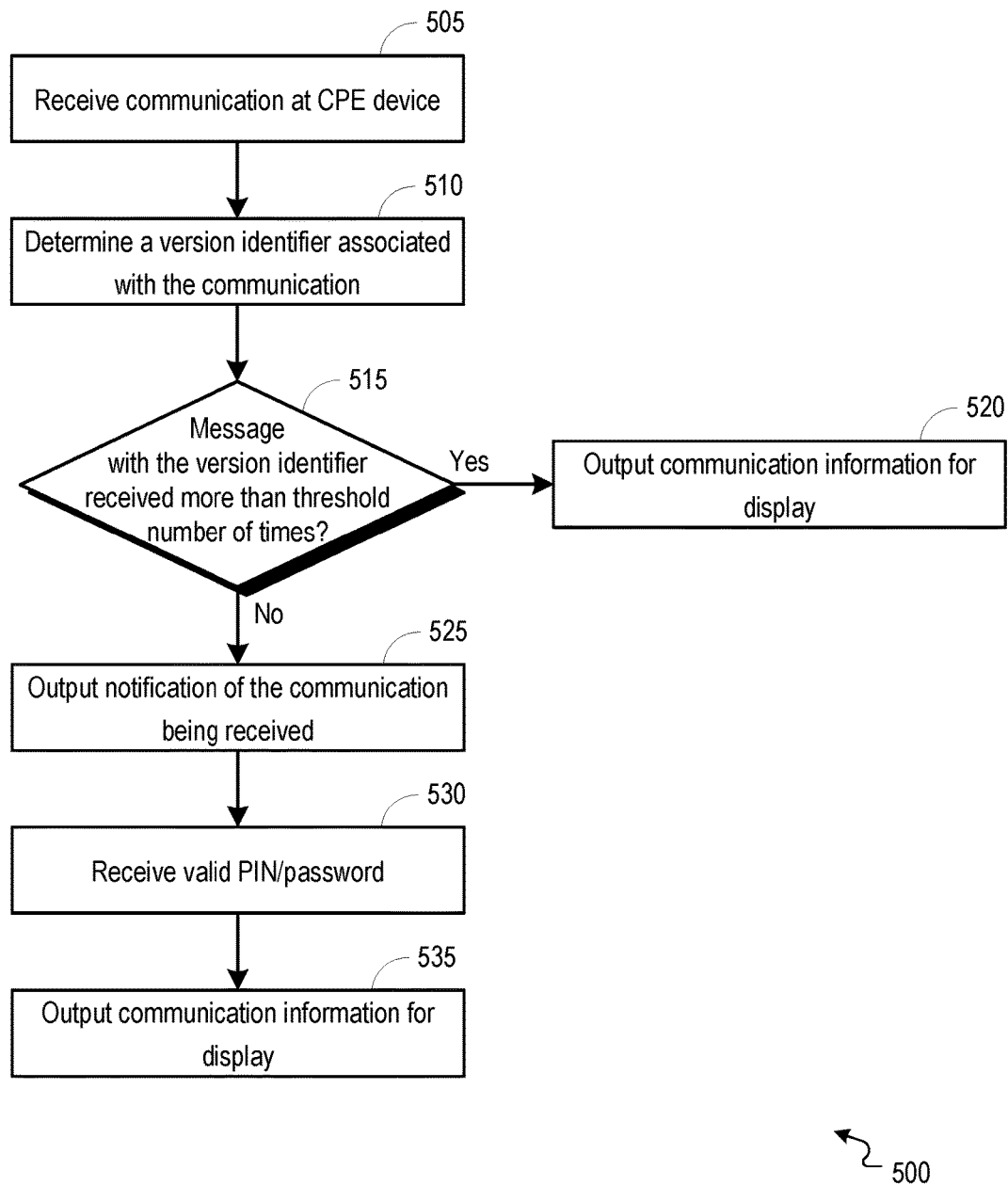
FIG. 5 is a flowchart illustrating an example process operable to facilitate the selective forwarding of communication information based on the number of times a communication is delivered to a device.

FIG. 5 is a flowchart illustrating an example process 500 operable to facilitate the selective forwarding of communication information based on the number of times a communication is delivered to a device. The process 500 can begin at 505, when a communication is received at a CPE device. The CPE device may be an access device 110 of FIG. 1, a STB 115 of FIG. 1, or any other device configured to provide one or more services to a client device (e.g., client device 105 of FIG. 1). The received communication may be a telephone call or message, an appointment or calendar reminder, an electronic mail message, a notification of a received message, communication information (e.g., caller identification information), and various other types of communications.

At 510, a version identifier of the communication may be determined. The version identifier may be determined, for example, by the communication forwarding module 210 of FIG. 2. In embodiments the version identifier may be parsed from the received communication and analyzed by the communication forwarding module 210. The version identifier may include an identifier that indicates a certain version of the communication.

At 515, a determination may be made whether a message having the same version identifier as the version identifier of the received communication has been received at the CPE device more than a threshold number of times. The determination whether the same version identifier as the version identifier of the received communication has been received at the CPE device more than a threshold number of times may be made, for example, by the communication forwarding module 210 of FIG. 2. In embodiments, the communication forwarding module 210 may compare the version identifier to one or more previously received version identifiers, and a count may be maintained for each of the previously received version identifiers (e.g., the version identifiers and counts may be stored at the privacy settings data store 215 of FIG. 2).

If, at 515, the determination is made that the same version identifier as the version identifier of the received communication has been received at the CPE device more than a threshold number of times, the process 500 may proceed to 520. At 520, communication information associated with the received communication may be output for display. The communication information may be output, for example, by the communication forwarding module 210 of FIG. 2 to a connected or associated display device (e.g., client device 105 of FIG. 1). In embodiments, the communication information may include a telephone voice or text message, a telephone call, caller identification information (e.g., caller name, location, phone number, etc.), a notification, a reminder, or other content or information associated with a message received at the CPE device.

If, at 515, the determination is made that the same version identifier as the version identifier of the received communication has not been received at the CPE device more than a threshold number of times, the process 500 may proceed to 525. At 525, a notification of the communication being received may be output. The notification of the communication being received may be output, for example, by the communication forwarding module 210 of FIG. 2 to a connected or associated display device (e.g., client device 105 of FIG. 1). In embodiments, the notification may only include enough information to inform a viewer that a communication has been received. For example, to protect the privacy of the message, the notification may not include any information identifying the sender or the content of the received communication. In embodiments, when the determination is made that the communication is to be protected, the communication forwarding module 210 may cause the communication and/or information associated with the communication to be temporarily stored or cached at the CPE device (e.g., at the communication information data store 220 of FIG. 2). The version identifier may be added to a list of previously received version identifiers, or if the version identifier already exists in the list of previously received version identifiers, a count of the number of times the version identifier has been received may be incremented. For example, the list of previously received version identifiers may be stored at the privacy settings data store 215 of FIG. 2.

At 530, a valid PIN/password may be received. The valid PIN/password may be received, for example, by the communication forwarding module 210 of FIG. 2. In embodiments, a user may request that the communication be output for display, and in response, the CPE device may output a prompt to a display device, the prompt requesting that the user input a valid PIN/password. For example, the CPE device may be configured with a PIN/password to protect the privacy of certain communications. The CPE device (e.g., the communication forwarding module 210) may compare a received PIN/password to a PIN/password with which the CPE device is configured, and if the PIN/password received from the user matches the PIN/password configured at the CPE device, the determination may be made that a valid PIN/password has been received.

At 535, the communication and/or information associated with the communication may be output for display. The communication information may be output, for example, by the communication forwarding module 210 of FIG. 2 to a connected or associated display device (e.g., client device 105 of FIG. 1). In embodiments, the communication information may include a telephone voice or text message, a telephone call, caller identification information (e.g., caller name, location, phone number, etc.), a notification, a reminder, or other content or information associated with a message received at the CPE device.

Figure 6:
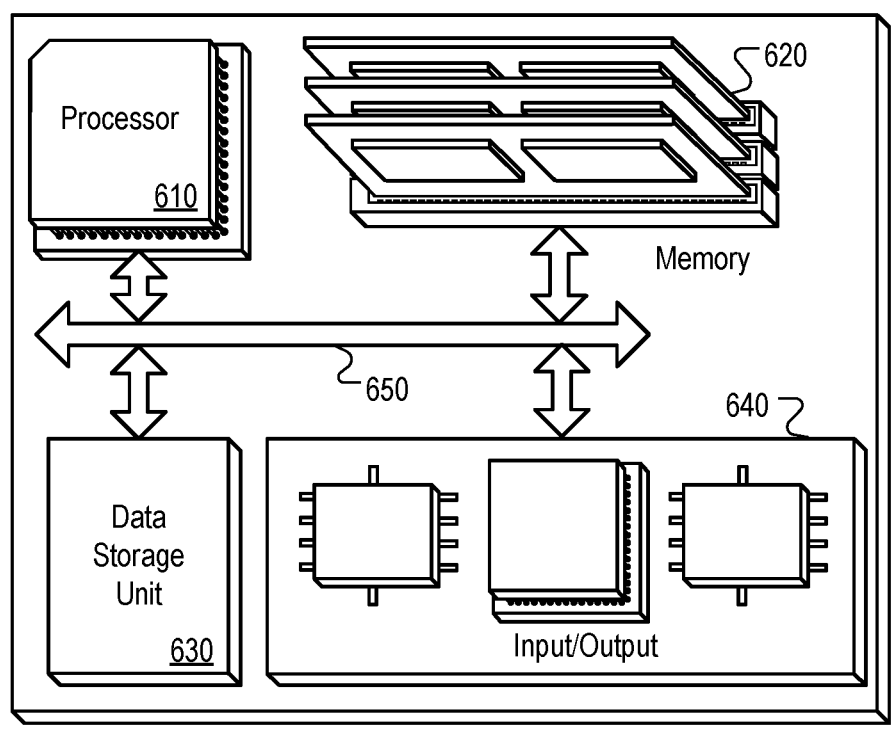
FIG. 6 is a block diagram of a hardware configuration operable to facilitate the selective forwarding of communication information.

FIG. 6 is a block diagram of a hardware configuration 600 operable to facilitate the selective forwarding of communication information. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, STB, computer, mobile device, tablet, etc.), an access device 110 of FIG. 1 (e.g., gateway device, wireless router, network extender, etc.), or STB 115 of FIG. 1. In embodiments, the input/output device can include driver devices configured to send communications to, and receive communications from one or more networks (e.g., WAN 120 of FIG. 1, provider network 125 of FIG. 1, local network, etc.).

Those skilled in the art will appreciate that the invention improves upon methods and systems for forwarding communications to devices associated with a home network. Methods, systems and computer readable media described herein may facilitate the automatic identification of a need for additional authentication based on a received private message or PID, the urgency of a received private message, thus determining whether an immediate alert is output to a user, and/or a determination whether a protected message is to be archived for later retrieval via authentication. A device may be configured (e.g., by user input) to control selective decoding and display of messages (e.g., private messages), registration and configuration of blacklists, and/or defining criteria for determining urgency of a received message. Device configurations may be dynamically changed or updated according to user preferences and user treatment of received messages.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
 receiving a communication at a customer premise equipment device;
 identifying a property of the received communication, wherein the property of the received communication comprises either a packet identifier defined for application gateway messages or a packet identifier defined for messages that are to be protected, wherein the packet identifier is added to the communication by a headend device, and wherein the packet identifier is parsed from the communication by the customer premise equipment device;

comparing the parsed packet identifier to one or more packet identifiers defined for messages that are to be protected, wherein the one or more packet identifiers defined for messages that are to be protected are stored at the customer premise equipment device;

determining whether the identified property matches a packet identifier defined for messages that are to be protected;

if the identified property does not match a packet identifier defined for messages that are to be protected, outputting information associated with the communication to a display; and if the identified property does match a packet identifier defined for messages that are to be protected, refraining from outputting, to a display, information associated with the communication until a valid passcode is received.

2. The method of claim 1, wherein the identified property of the received communication comprises a source identifier, and wherein the one or more private communication properties comprise one or more source identifiers designated for privacy protection.

3. The method of claim 1, wherein:
the identified property of the received communication comprises a version identifier; and
the one or more private communication properties comprise one or more version identifiers and, for each respective version identifier, a count of the number of times a communication having the respective version identifier has been previously received at the customer premise equipment device.

4. The method of claim 1, further comprising:
if the identified property does match a packet identifier defined for messages that are to be protected:
outputting a notification to a user that a privacy protected communication has been received at the customer premise equipment device;
receiving a valid passcode; and
outputting information associated with the communication to a display.

5. The method of claim 4, wherein the notification comprises a prompt requesting entry of a valid passcode.

6. The method of claim 4, further comprising:
storing information associated with the communication at the customer premise equipment device.

7. An apparatus comprising:
one or more interfaces configured to be used to receive a communication; and
one or more modules configured to:
identify a property of the received communication, wherein the property of the received communication comprises either a packet identifier defined for application gateway messages or a packet identifier defined for messages that are to be protected, wherein the packet identifier is added to the communication by a headend device, and wherein the packet identifier is parsed from the communication;
compare the parsed packet identifier to one or more packet identifiers defined for messages that are to be protected, wherein the one or more packet identifiers defined for messages that are to be protected are stored at the apparatus;
determine whether the identified property matches a packet identifier defined for messages that are to be protected;

if the identified property does not match a packet identifier defined for messages that are to be protected, output information associated with the communication to a display; and if the identified property does match a packet identifier defined for messages that are to be protected, refrain from outputting, to a display, information associated with the communication until a valid passcode is received.

8. The apparatus of claim 7, wherein the identified property of the received communication comprises a source identifier, and wherein the one or more private communication properties comprise one or more source identifiers designated for privacy protection.

9. The apparatus of claim 7, wherein:
the identified property of the received communication comprises a version identifier; and
the one or more private communication properties comprise one or more version identifiers and, for each respective version identifier, a count of the number of times a communication having the respective version identifier has been previously received at the customer premise equipment device.

10. The apparatus of claim 7, wherein, if the identified property does match a packet identifier defined for messages that are to be protected, the one or more modules are further configured to:
output a notification to a user that a privacy protected communication has been received at the customer premise equipment device;
receive a valid passcode; and
output information associated with the communication to a display.

11. The apparatus of claim 10, wherein the notification comprises a prompt requesting entry of a valid passcode.

12. One or more non-transitory computer readable media having instructions operable to cause one or more processors to perform the operations comprising:
receiving a communication at a customer premise equipment device;
identifying a property of the received communication, wherein the property of the received communication comprises either a packet identifier defined for application gateway messages or a packet identifier defined for messages that are to be protected, wherein the packet identifier is added to the communication by a headend device, and wherein the packet identifier is parsed from the communication by the customer premise equipment device;
comparing the parsed packet identifier to one or more packet identifiers defined for messages that are to be protected, wherein the one or more packet identifiers defined for messages that are to be protected are stored at the customer premise equipment device;
determining whether the identified property matches a packet identifier defined for messages that are to be protected;
if the identified property does not match a packet identifier defined for messages that are to be protected, outputting information associated with the communication to a display; and
if the identified property does match a packet identifier defined for messages that are to be protected, refraining from outputting, to a display, information associated with the communication until a valid passcode is received.

13. The one or more non-transitory computer-readable media of claim 12, wherein the identified property of the received communication comprises a source identifier, and wherein the one or more private communication properties comprise one or more source identifiers designated for privacy protection.

14. The one or more non-transitory computer-readable media of claim 12, wherein:
the identified property of the received communication comprises a version identifier; and
the one or more private communication properties comprise one or more version identifiers and, for each respective version identifier, a count of the number of times a communication having the respective version identifier has been previously received at the customer premise equipment device.

15. The one or more non-transitory computer-readable media of claim 12, wherein, if the identified property does match a packet identifier defined for messages that are to be protected, the instructions are further operable to cause one or more processors to perform the operations comprising:
outputting a notification to a user that a privacy protected communication has been received at the customer premise equipment device;
receiving a valid passcode; and
outputting information associated with the communication to a display.

16. The one or more non-transitory computer-readable media of claim 15, wherein the notification comprises a prompt requesting entry of a valid passcode.

17. The one or more non-transitory computer-readable media of claim 15, further comprising:
storing information associated with the communication at the customer premise equipment device.

* * * * *